United States Patent [19]

Humpleman

[11] Patent Number: 4,855,615

[45] Date of Patent: Aug. 8, 1989

[54] SWITCHING CIRCUIT AVOIDING GLITCHES AT THE INSTANT OF SWITCH-OVER BETWEEN TWO CLOCK SIGNALS

[75] Inventor: Richard J. Humpleman, Talke, Great Britain

[73] Assignee: Active Memory Technology Ltd., England

[21] Appl. No.: 62,158

[22] Filed: Jun. 12, 1987

[51] Int. Cl.[4] .................... H03K 5/13; H03K 17/687; H03K 1/17; G05B 15/08

[52] U.S. Cl. .................... 307/269; 307/582; 307/480; 307/272.1; 328/63; 328/72; 364/131

[58] Field of Search .............. 328/55, 63, 72, 109, 328/61, 104, 154, 175; 307/269, 262, 480, 582, 272 R, 272 A, 243, 247; 364/131

[56] References Cited

U.S. PATENT DOCUMENTS

| | | | |
|---|---|---|---|
| 3,751,679 | 8/1973 | Rotier | 307/243 |
| 4,201,927 | 8/1980 | Zuk | 307/269 |
| 4,229,699 | 10/1980 | Frissell | 307/243 |
| 4,480,198 | 10/1984 | Gass | 307/269 |
| 4,644,568 | 2/1987 | Canniff et al. | 328/154 |
| 4,677,433 | 6/1987 | Catlin et al. | 364/131 |
| 4,689,496 | 8/1987 | Kerber et al. | 307/269 |
| 4,696,019 | 9/1987 | Tulpule et al. | 364/131 |

Primary Examiner—Stanley D. Miller
Assistant Examiner—Trong Quang Phan
Attorney, Agent, or Firm—Lyon & Lyon

[57] ABSTRACT

A switching circuit is described, for selecting between first and second clock signals. When it is desired to switch from the first to the second clock signal, the first clock signal is de-selected in synchronism with the beat of the first clock and then, after a delay, the second clock signal is selected in synchronism with the beat of the second clock. Conversely, when it is desired to switch from the second to the first clock signal, the second clock signal is de-selected in synchronism with the beat of the second clock and then, after a delay, the first clock signal is selected in synchronism with the beat of the first clock. This avoids the possibility of a short pulse or "glitch" at the instant of switch-over.

3 Claims, 1 Drawing Sheet

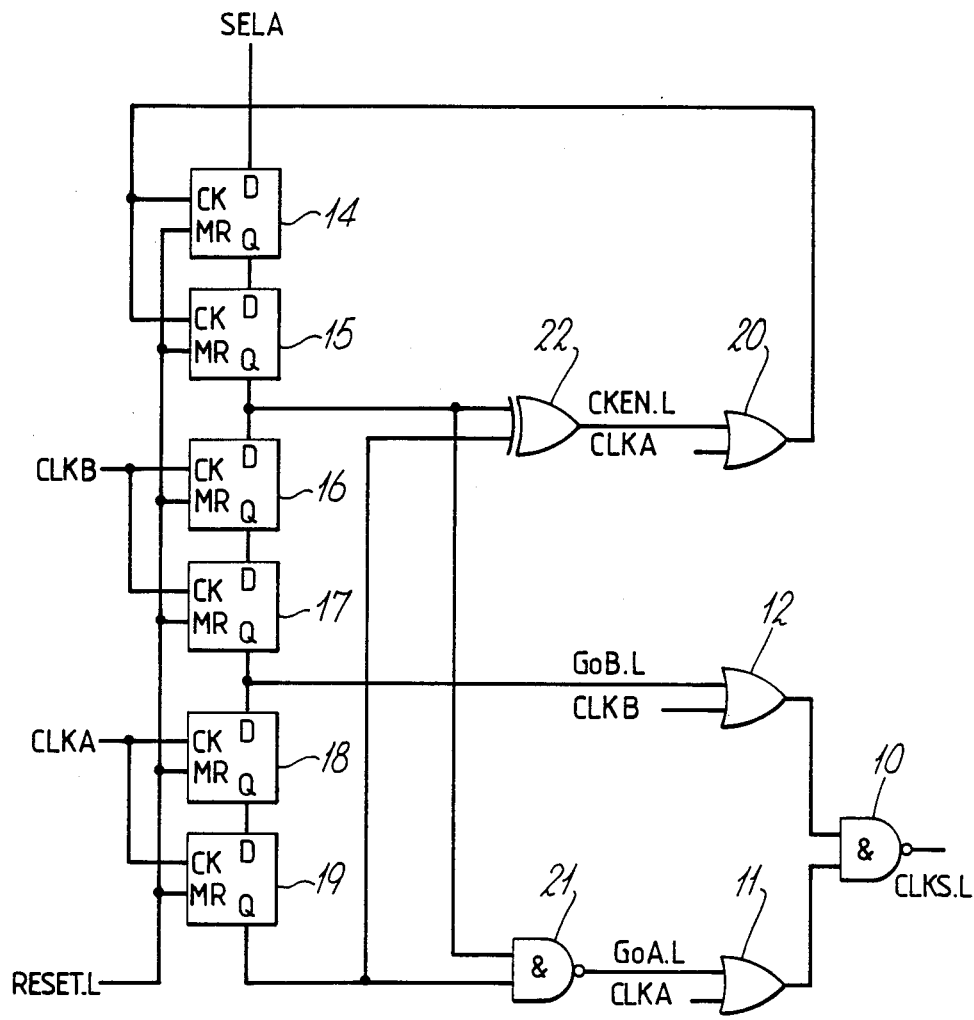

SWITCHING CIRCUIT AVOIDING GLITCHES AT THE INSTANT OF SWITCH-OVER BETWEEN TWO CLOCK SIGNALS

This invention relates to a switching circuit for selecting between two clock signals.

In a digital electronic apparatus, it may sometimes be desired to provide two or more clock sources, and to provide some means for switching between the outputs of the clock sources so as to select a clock signal for the apparatus. For example, the system may include a programmable clock source, which has an undefined output while it is being programmed. In this case, it is convenient to switch to an alternative, stable clock source while the first source is being programmed, and then to switch back to the first source at some later time when it is stable.

However, switching between clock sources can cause a problem since, at the instant of switching, a short pulse or "glitch" of less than the minimum permitted width may be produced, and this may cause errors in the rest of the apparatus.

The object of the invention is to overcome this problem.

SUMMARY OF THE INVENTION

According to the invention there is provided a switching circuit for selecting between first and second clock signals, comprising first selection means for selecting the first clock signal, second selection means for selecting the second clock signal, and control means operable to disable the first selection means for selecting the first clock signal, second selection means for selecting the second clock signal, and control means operable to disable the first selection means in synchronism with the first clock signal and then, after a predetermined time delay, to enable the second selection means in synchronism with the second clock signal.

Thus, it can be seen that when switching from the first clock signal to the second, the first clock is deselected in synchronism with that clock, and then, after a period in which neither clock is selected, the second clock is selected in synchronism with that second clock. This avoids the risk of undesired short clock pulses.

Preferably, the switching circuit can also operate in a similar manner for switching from the second signal to the first. Thus, preferably, the control means is alternatively operable to disable the second selection means in synchronism with the second clock signal and then, after a predetermined time delay, to enable the first selection means in synchronism with the first clock signal.

BRIEF DESCRIPTION OF THE DRAWING

One switching circuit in accordance with the invention will now be described by way of example with reference to the accompanying drawing which is a logic circuit diagram of the switching circuit.

DESCRIPTION OF AN EMBODIMENT OF THE INVENTION

Referring to the drawing, this shows a switching circuit for selecting between two input clock signals CLKA and CLKB. The selected clock signal appears, in inverted form, as output clock signal CLKS.L.

The output clock signal CLKS.L is produced by a NAND gate 10 having two inputs. One input of the NAND gate is connected to the output of an OR gate 11, one input of which receives the clock signal CLKA and the other input of which receives a control signal GOA.L for selecting CLKA. The "L" indicates that the low voltage logic level is the active level for this signal GOA.L. The other input of the NAND gate 10 is connected to the output of an OR gate 12, one input of which receives the clock signal CLKB and the other input of which receives a control signal GOB.L for selecting CLKB.

It can be seen that when GOA.L is at the low voltage logic level, and GOB.L is at the high voltage logic level, the clock signal CLKA is selected and appears (inverted) as CLKS.L. Conversely, when GOA.L is high and GOB.L is low, then clock signal CLKB is selected. If both GOA.L and GOB.L are high, then neither clock signal is selected. As will become apparent from the following description, GOA.L and GOB.L are never both low at the same time.

The switching circuit is controlled by a chain of six D-type flip-flops (bistable circuits) 14-19. Each of these flip-flops has a data input D, a data output Q, a clock input CK, and a reset input MR. The Q output of each of the flip-flops, other than the last, is connected to the D input of the next in the chain.

The D input of the first flip-flop 14 receives a selection control signal SELA which indicates which of the clock signals is to be selected. When SELA is high, this indicates that clock CLKA is to be selected. When SELA is low, CLKB is to be selected.

The clock inputs CK of flip-flops 14,15 are both connected to the output of an OR gate 20, one input of which receives the clock signal CLKA and the other input of which receives a control signal CKEN.L. Thus, when CKEN.L is low, the flip-flops 14,15 are both clocked at each beat of the clock signal CLKA. When CKEN.L is high, the output of the OR gate 20 is held at a constant high level and so the flip-flops 14,15 are not clocked.

The clock inputs CK of flip-flops 16,17 both receive the clock signal CLKB, while the clock inputs of flip-flops 18,19 both receive the clock signal CLKA.

The reset inputs MR of all six flip-flops receive a reset signal RESET.L which resets each flip-flop to the state in which the Q output is low.

The Q output of flip-flop 17 provides the control signal GOB.L which selects the clock CLKB.

The Q outputs of flip-flops 15 and 19 are combined in a NAND gate 21, the output of which provides the control signal GOA.L which selects the clock signal CLKA. The Q outputs of these two flip-flops 15,19 are also combined in an EXCLUSIVE-OR gate 22, the output of which provides the signal CKEN.L which permits the clock CLKA to be applied to the flip-flops 14,15.

Operation

The operation of the circuit will now be described.

It is assumed that initially the circuit has been reset by RESET.L so that all the flip-flops are in their reset states, i.e. the Q output of each flip-flop is low. It is also assumed that SELA is initially low.

Since the Q output of flip-flop 17 is low, GOB.L is low and hence clock CLKB is selected. Since the Q outputs of flip-flops 15 and 19 are low, the output GOA.L of NAND gate 21 is high, and hence clock CLKA is not selected. Also, the output CKEN.L of the EXCLUSIVE-OR gate 22 is low, and hence clock pulses are applied to the flip-flops 14 and 15. Since SELA is low, these flip-flops will remain in the reset state.

Suppose now that SELA is switched to the high logic level, indicating that CLKA is to be selected.

At the first beat of clock CLKA, flip-flop 14 is set, so that its Q output goes high. Then, at the next beat of clock CLKA, flip-flop 15 is set, so that its Q output goes high.

Since one input of the EXCLUSIVE-OR gate 22 is now high and the other low, its output CKEN.L goes high. This suppresses the clocking of the flip-flops 14,15 so that they are frozen in their existing states.

At the first beat of clock CLKB following the setting of flip-flop 15, the flip-flop 16 is set and then, at the next beat of CLKB, flip-flop 17 is also set. This makes GOB.L high, and therefore de-selects the clock CLKB.

At the first beat of clock CLKA following the setting of flip-flop 17, the flip-flop 18 is set and then, at the next beat of CLKA, the flip-flop 19 is also set.

Since the Q outputs of flip-flops 15 and 19 are now both high, the NAND gate 21 is now enabled, and GOA.L therefore goes low, so that clock CLKA is now selected. Also, both inputs to the EXCLUSIVE-OR gate 22 are now high, so that the signal CKEN.L goes low again, allowing clocking of the flip-flops 14,15 to resume.

In summary, it can be seen that when SELA is set high, after an initial delay through the flip-flops 14-17 the clock signal CLKB is de-selected, in synchronism with the beat of CLKB. Then, after a further delay through the flip-flops 18 and 19, the clock signal CLKA is selected, in synchronism with the beat of CLKA. Thus, the switch-over from CLKB to CLKA is achieved without any risk of "glitches".

Suppose now that SELA is switched back to the low logic level, indicating that CLKB is to be selected again.

At the first beat of CLKA, flip-flop 14 is reset, and then at the next beat of CLKA flip-flop 15 is also reset. The Q output of flip-flop 15 is therefore now low. This causes the signal CKEN.L to go high, preventing further clocking of the flip-flops 14,15. The low output of flip-flop 15 also disables the NAND gate 21, making GOA.L high, which de-selects the clock CLKA.

At the first beat of CLKB following resetting of flip-flop 15, flip-flop 16 is reset and then, at the next beat of CLKB, flip-flop 17 is also reset. This makes GOB.L low, which selects the clock CLKB.

At the first beat of CLKA following resetting of flip-flop 17, flip-flop 18 is reset and then, at the next beat of CLKA, flip-flop 19 is also reset. Both inputs to the EXCLUSIVE-OR gate 22 are therefore now low, so that CKEN.L now goes low, permitting clocking of the flip-flops 14,15 to resume.

Thus, in summary, it can be seen that when SELA is set low, after an initial delay through the flip-flops 14,15, the clock signal CLKA is deselected, in synchronism with the beat of CLKA. Then, after a further delay through the flip-flops 16,17, the clock signal CLKB is selected, in synchronism with the beat of CLKB.

It should be noted that the clocking of the flip-flops 14,15 is suppressed while the switch-over between the clock signals is in progress. Thus, any changes in SELA occurring while the switch-over is in progress are ignored.

I claim:

1. A switching circuit for selecting between first and second clock signals, comprising first selection means for selecting the first clock signal, second selection means for selecting the second clock signal, and control means operable to disable the first selection means in synchronism with the first clock signal and then, after a predetermined time delay, to enable the second selection means in synchronism with the second clock signal, wherein the control means is alternatively operable to disable the second selection means in synchronism with the second clock signal and then, after a predetermined time delay, to enable the first selection means in synchronism with the first clock signal, wherein the control means comprises a chain of flip-flops connected in series, the first flip-flop in the series receiving a selection control signal specifying which of the clock signals is to be selected, wherein the chain of flip-flops comprises first, second, and third sections, the first and third sections being clocked by the first clock signal and the second section being clocked by the second clock signal, wherein the outputs of the first and third sections are combined to produce a first control signal which enables the first selection means when both those outputs have a predetermined value, and wherein the output of the second section provides a second control signal which enables the second selection means when that output has a predetermined value.

2. A switching circuit according to claim 1 further including gating means operable upon detection of inequality between the outputs of the first and third sections, for suppressing the clocking of the first section.

3. A switching circuit according to claim 2 wherein each of said sections consists of two flip-flops.

* * * * *